United States Patent [19]
Hawthorne

[11] Patent Number: 6,018,583
[45] Date of Patent: Jan. 25, 2000

[54] SECURE COMPUTER NETWORK

[75] Inventor: William McMullan Hawthorne, Norwich, United Kingdom

[73] Assignee: Chantilley Corporation LTD, Buckinghamshire, United Kingdom

[21] Appl. No.: 08/809,528

[22] PCT Filed: Sep. 18, 1995

[86] PCT No.: PCT/GB95/02209

§ 371 Date: Mar. 14, 1997

§ 102(e) Date: Mar. 14, 1997

[87] PCT Pub. No.: WO96/08756

PCT Pub. Date: Mar. 21, 1996

[30] Foreign Application Priority Data

Sep. 16, 1994 [GB] United Kingdom .................... 9418709

[51] Int. Cl.[7] ............................... H04L 9/00; H04L 9/02
[52] U.S. Cl. ................... 380/49; 380/49; 380/21
[58] Field of Search ................................. 380/25, 49, 45; 395/200.59, 181.101

[56] References Cited

U.S. PATENT DOCUMENTS 4,238,853 12/1980 Ehrsam et al. ............................... 375/2
5,172,414 12/1992 Reeds, III et al. ....................... 380/45

FOREIGN PATENT DOCUMENTS 0 228 634  12/1986  European Pat. Off. .
0421 409   4/1990   European Pat. Off. .
0 472 939  7/1991   European Pat. Off. .
WO 94/04972 3/1994  WIPO .

Primary Examiner—Tod R. Swann
Assistant Examiner—Todd Jack
Attorney, Agent, or Firm—David P. Gordon; David S. Jacobson; Thomas A. Gallagher

[57] ABSTRACT

A secure network comprises a plurality of terminals connected to a common file server. Each terminal holds in its memory an encrypted unique variable and unique first and second conjugates for each user authorized to use that terminal. The unique variable is generated, at the time of registration of a user, from master keys stored on a separate disc or other memory medium, the identity number of the terminal, and the identity number of the user to be registered. A password is randomly generated and used to encrypt the unique variable. The first conjugate is a randomly generated message, which is encrypted using the password to generate the second conjugate. In order to log on at a given terminal, the user must enter his password, and the terminal then uses this password as the key to encrypt the first conjugate, and compares it with the stored second conjugate. If the first and second conjugate agree, the terminal is enabled for the person to use. A high level of security is therefore attained.

9 Claims, 1 Drawing Sheet

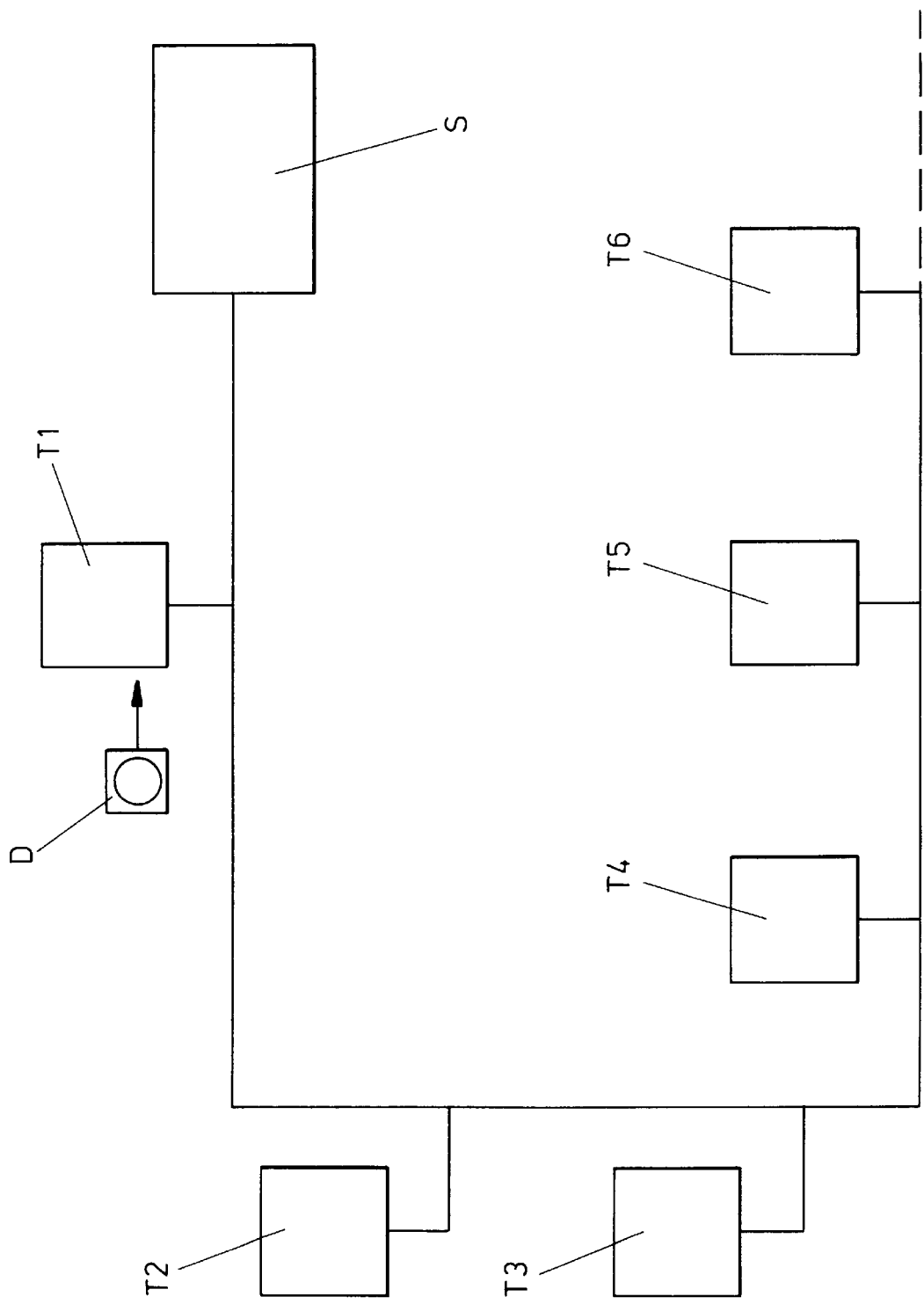

SECURE COMPUTER NETWORK

BACKGROUND OF THE INVENTION

1. Field of the Invention

This invention relates to computer networks and more particularly to a computer network arranged to provide a high level of security.

It is common in computer networks for individual users to be required to enter their personal passwords in order to gain access to the system. However, present password-based security arrangements are prone to a number of abuses, which undermine the security of the system.

SUMMARY OF THE INVENTION

We have now devised a computer network which is arranged to provide a high level of security, and which is not open to degradation of that high level of security.

In accordance with the present invention, there is provided a computer network system which comprises a plurality of individual remote terminals and a central file server, each terminal being arranged to hold, in a memory thereof, an encrypted unique variable and unique first and second conjugates for each user authorised to use that terminal, the second conjugate being a password-encrypted form of the first conjugate.

This system is thus arranged so that in order to log on at a given terminal, the user must enter his password, and the terminal then uses this password as the key to encrypt the first conjugate which is stored at that terminal for that user, and compares that encrypted first conjugate with the stored second conjugate: if the two agree, the terminal is enabled for that person to use.

The system requires each person to register at each terminal which he is intended to use: he cannot use any terminal at which he is not registered.

The system enables each person, once registered, to change his password at will. In order to do this, the system requires the person to log on as described above, then (in response to the user entering the required commands) call up the encrypted unique variable for that user and decrypts that encrypted unique variable, using the user's current password (the encrypted unique variable which is stored being a password—encryption of the unique variable itself). The system then allows the user to select and enter his own new password, and the terminal then encrypts the user's unique variable with the new password, and creates new first and second conjugates (the second conjugate being a password-encrypted form of the first conjugate, as previously). The terminal now stores, for that user, his new encrypted unique variable and new first and second conjugates, in place of the original ones.

Preferably the system is arranged to create the first conjugate (at initial registration and on change-of-password) on a random basis. Preferably the unique code is generated by the terminal, at initial registration, by a predetermined algorithm and as a function of (a) a master key or set of master keys, (b) a unique identifying number or code for the terminal, and (c) a unique identifying number or code for the particular user to be registered. Preferably the master key (or set of master keys) is entered at the terminal temporarily for each registration procedure, by a security manager. Preferably the master keys are held on a disc or other memory medium normally kept secure by the security manager.

The master key or keys are also held in memory in a secure manner at the central file server. The system is able to transmit data in encrypted form between the file server and terminal and vice versa, in the following manner.

Thus, the user logs on at his terminal, as described above. The system is arranged so that, for the purpose of encrypted transmission, it calls up the user's encrypted unique variable and decrypts this with the user's password. The terminal then randomly generates a session key, and encrypts the session key with the unique variable (preferably however, the terminal also randomly generates an open key and the session key is encrypted with the unique variable and the open key). The encrypted session key (or both encrypted session key and open key) are sent as headers from the terminal to the server, together with the user's identity number. It will be appreciated that because the file server stores the master keys, then it is able to recreate the particular user's unique variable (for the terminal which he is operating) from (a) the master keys, (b) the terminal identity number and (c) the user's identity number. From this (and from the open key also transmitted as header to the file server), the file server is arranged to determine the random session key.

Communication between the terminal and file server then proceeds with each message being encrypted by the random session key before being sent (whether from the terminal to the server or from the server to the terminal), and decrypted by the random session key at the receiving end. Each terminal may be arranged to change the session key periodically, for example for each new session of use, or at intervals within each session of use.

An embodiment of this invention will now be described by way of example only and with reference to the accompanying drawing.

BRIEF DESCRIPTION OF THE DRAWING

The Drawing is a schematic diagram of a computer network system according to the invention.

DETAILED DESCRIPTION OF THE PREFERRED EMBODIMENT

Referring to the drawing, there is shown a typical computer network comprising a plurality of terminals T1,T2 etc. connected to a common file server S. In order to register a particular user at a particular terminal, say terminal T1, the security manager carries out the following procedure. Thus, the security manager temporarily loads a disc D at that terminal T1, the disc D holding a plurality of master keys, say 40 keys (typically each key being a number of several digits length). The security manager also enters, at that terminal T1, the identity number of the user being registered. A registration program, held in the terminal or loaded into the terminal from the disc D, then generates a unique variable from (a) the master keys, (b) the identity number of the terminal and (c) the identity number of the user to be registered. An initial password is pseudo randomly generated and given to the user and entered at the terminal T1, and the registration program then encrypts the unique variable using the initial password. Further, the registration program creates first and second conjugates: the first conjugate is a randomly-generated short message in plain, and then the first conjugate is encrypted by the initial password to form the second conjugate; this latter encryption is irreversible in that the first conjugate (or a part thereof) is used to form part of the primitives for the encryption. The registration procedure concludes with the terminal T1 storing (a) the encrypted unique variable, (b) the first conjugate and (c) the second conjugate, these being stored at the terminal T1 against the user's name.

In order that the user can now use the network from that terminal T1, he must enter his password for verification. Firstly he enters his name, then his password. Upon entering the password, the terminal T1 (under control of its security program) reads the first conjugate from its memory store, and encrypts this with the password as entered: the result is compared with the second conjugate also held in the memory store; if there is agreement, the entered password is verified and the terminal T1 is enabled for that user to use.

The user, after initial registration, will want to change his initial password to a password known only to himself. In order to do this, firstly he logs on at the terminal T1 for which he is registered, using his initial password in the procedure described above. He then uses the security program to call up the encrypted unique variable, which is held in the terminal's memory against his name, and re-enters his password to decrypt the encrypted unique variable, i.e. giving the unique variable itself. The user then selects his own password, and enters this at the same terminal: the terminal T1 encrypts the unique variable with the new password, and creates new first and second conjugates in the same manner as in initial registration, described above. The terminal T1 then stores, against that user's name, the new encrypted unique variable and the new first and second conjugates, in place of the original ones. In order to log on in future at that terminal, the user must enter his new password for verification, as described previously.

Communication between each terminal T1,T2 etc and the file server S takes place in encrypted manner, as follows. Thus, once a user logs on at a terminal e.g. T1 for which he is registered (in the manner described above), he calls up his encrypted unique variable from the terminal's memory store, and decrypts this by re-entering his password, which recreates the unique variable itself. The terminal's security program now randomly generates an open key and a session key, and encrypts the session key with the unique variable and open key. The open key and the encrypted session key are sent as headers, together with the user's identity number, to the file server S. The file server S permanently stores the master keys (the same set of master keys which are carried by the security manager's disc D which was loaded temporarily at registration). The file server S is thus able to reconstruct the unique variable for the user at the relevant terminal T1, from (a) the master keys, (b) the terminal number and (c) the user's identity number. The file server S is therefore able, using the reconstructed unique variable and the open key transmitted to it as a header, to determine the random session key from the encrypted session key which it receives from the terminal T1. Communication between the terminal T1 and the file server S then proceeds with each message being encrypted by the random session key before being sent from the terminal T1 to the server S, and the encrypted message being decrypted at the file server S using the random session key reconstructed by the file server S. Communication of messages or data from the file server S to the terminal T1 is similarly encrypted at the server S and decrypted at the terminal T1. The session key can be changed for each new session of use, or it can be changed periodically even within each session of use (e.g. after predetermined intervals of time).

I claim:

1. A computer network system having a plurality of individual remote terminals and a central file server coupled to the terminals, requiring each user to be registered at each terminal which the user is intended to use and then allowing each user to change his password at each terminal, said system comprising:

(a) means for generating a unique variable for the new user and encrypting the unique variable with an initially-entered password, so forming a password-encrypted unique variable;

(b) means for creating a randomly-generated message, called a first conjugate;

(c) means for encrypting the first conjugate with the initially-entered password, so forming a second conjugate; and (d) means for storing the password-encrypted unique variable and the first and second conjugates;

(e) means for retrieving the first conjugate for the user;

(f) means for encrypting the retrieved first conjugate with the password entered by the user and comparing the result with the stored second conjugate for the user, and, in the event of a match, (g) means for enabling the terminal for use by the user when the encrypted first conjugate matches the second conjugate;

(h) means for retreiving the encrypted unique variable once the user has accessed the terminal;

(i) means for decrypting the encrypted unique variable, using the user's current password, to re-create the user's unique variable;

(j) means for encrypting the re-created unique variable with a new password entered by the user, so creating a new password-encrypted unique variable;

(k) means for creating a new first conjugate and encrypting the new first conjugate with the user's new password to form a new second conjugate; and (l) means for storing the new password-encrypted unique variable, the new first conjugate and the new second conjugate.

2. A computer network system as claimed in claim 1, wherein:

said means for generating a unique variable operates according to a predetermined algorithm and a function of a master key or set of master keys, a unique identifying number or code for that terminal, and a unique identifying number or code for the user to be registered.

3. A computer network system as claimed in claim 2, wherein:

said means for generating a unique variable receives the master key, or set of master keys, temporarily for each registration procedure.

4. A computer network system as claimed in claim 2, wherein:

the master key, or set of master keys, is stored on a disc or other memory medium.

5. A computer network system as claimed in claim 2, wherein:

the master key, or set of master keys, is stored in memory at the central file server.

6. A computer network system as claimed in claim 2, wherein each terminal further comprises:

(m) means for randomly generating a session key;

(n) means for encrypting the session key using the rec-reated unique variable;

(o) means for encrypting a message to be transmitted from the respective terminal to the file server using the session key; and (p) means for transmitting the encrypted message, with the encrypted session key and user's identity number or code forming a header to the encrypted message.

7. A computer network as claimed in claim 6, wherein the file server comprises:

(q) means for recreating a user's unique variable from master keys stored by the server, the user's identity number or code and the sending terminal's identity number or code;

(r) means for determining the session key from the encrypted session key received from the sending terminal using the recreated unique variable of the sender; and (s) means for decrypting the encrypted message received from the sending terminal using the determined session key.

8. A computer network as claimed in claim 2, wherein the file server comprises:

(t) means for randomly generating a session key;

(u) means for recreating the user's unique variable from the master keys stored by the server, the user's identity number or code and the respective terminal's identity code or number;

(v) means for encrypting the session key using the recreated unique variable;

(w) means for encrypting a message to b e transmitted from said server to said terminal using the session key; and (x) means for transmitting the encrypted message, with the encrypted session key forming a header to said encrypted message.

9. A computer network as claimed in claim 8, wherein each terminal further comprisies:

(y) means for determining the session key from the encrypted session key received from the file server using the recreated unique variable of the user; and (z) means for decrypting the encrypted message received from the file server using the determined session key.

\* \* \* \* \*